United States Patent [19]

Midkiff et al.

[11] Patent Number: 5,709,735
[45] Date of Patent: Jan. 20, 1998

[54] HIGH STIFFNESS NONWOVEN FILTER MEDIUM

[75] Inventors: David Grant Midkiff, Alpharetta, Ga.; James Richard Neely, Appleton, Wis.

[73] Assignee: Kimberly-Clark Worldwide, Inc., Neenah, Wis.

[21] Appl. No.: 546,007

[22] Filed: Oct. 20, 1995

[51] Int. Cl.⁶ .................. B01D 39/08; B01D 46/52
[52] U.S. Cl. ................. 96/17; 55/521; 55/527; 55/528; 55/DIG. 5; 55/DIG. 39; 210/505; 428/304.4; 428/311.11; 428/311.51
[58] Field of Search .................. 55/527, 528, 521, 55/524, DIG. 45, DIG. 39, DIG. 5; 96/17; 428/296, 311.11, 311.51, 316.6, 304.4; 210/500.1, 503, 505

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,399,259 | 8/1968 | Brayford | 264/168 |
| 3,423,266 | 1/1969 | Davies et al. | 156/167 |
| 3,502,763 | 3/1970 | Hartmann | 264/210 |
| 3,542,615 | 11/1970 | Dobo et al. | 156/181 |
| 3,595,731 | 7/1971 | Davies et al. | 161/150 |
| 3,692,618 | 9/1972 | Dorschner et al. | 161/72 |
| 3,780,149 | 12/1973 | Keuchel et al. | 264/168 |
| 3,802,817 | 4/1974 | Matsuki et al. | 426/66 |
| 3,849,241 | 11/1974 | Butin et al. | 161/169 |
| 3,855,046 | 12/1974 | Hansen et al. | 161/150 |
| 4,041,203 | 8/1977 | Brock et al. | 428/157 |
| 4,189,338 | 2/1980 | Ejima et al. | 156/167 |
| 4,211,661 | 7/1980 | Perry | 210/491 |
| 4,215,682 | 8/1980 | Kubik et al. | 128/205.29 |
| 4,269,888 | 5/1981 | Ejima et al. | 428/296 |
| 4,280,860 | 7/1981 | Shen et al. | 156/167 |
| 4,340,563 | 7/1982 | Appel et al. | 264/518 |
| 4,374,888 | 2/1983 | Bornslaeger | 428/198 |
| 4,375,718 | 3/1983 | Wadsworth et al. | 29/592 |
| 4,414,276 | 11/1983 | Kiriyama et al. | 428/374 |
| 4,469,540 | 9/1984 | Furukawa et al. | 156/62.4 |
| 4,508,113 | 4/1985 | Malaney | 128/132 |
| 4,536,440 | 8/1985 | Berg | 428/284 |
| 4,547,420 | 10/1985 | Krueger et al. | 428/229 |
| 4,551,378 | 11/1985 | Carey, Jr. | 428/198 |
| 4,589,894 | 5/1986 | Gin et al. | 55/274 |
| 4,592,815 | 6/1986 | Nakao | 204/165 |
| 4,594,626 | 6/1986 | Frangesh | 360/97 |
| 4,629,474 | 12/1986 | Thornton | 264/109 |
| 4,657,804 | 4/1987 | Mays et al. | 428/212 |
| 4,663,220 | 5/1987 | Wisneski et al. | 428/221 |
| 4,729,371 | 3/1988 | Krueger et al. | 428/296 |
| 4,749,348 | 6/1988 | Klaase et al. | 425/174.8 |

(List continued on next page.)

FOREIGN PATENT DOCUMENTS

| | | | |
|---|---|---|---|
| 38369/93 | 11/1993 | Australia . | |
| 0 369 032 | 5/1990 | European Pat. Off. . | |
| 0 400 581 | 12/1990 | European Pat. Off. . | |
| 0 466 381 | 1/1992 | European Pat. Off. . | |
| 0 685 579 | 12/1995 | European Pat. Off. . | |
| 0 702 994 | 3/1996 | European Pat. Off. . | |
| 14 69 428 | 8/1974 | Germany . | |
| 2-2258007 | 10/1990 | Japan | 55/528 |
| 4-346805 | 12/1992 | Japan . | |
| 5-031310 | 2/1993 | Japan . | |
| 5-068824 | 3/1993 | Japan . | |
| 1 094 420 | 12/1967 | United Kingdom . | |
| 1 452 654 | 10/1976 | United Kingdom . | |
| 2 143 867 | 2/1985 | United Kingdom . | |
| 89/10989 | 11/1989 | WIPO . | |
| 93/01334 | 1/1993 | WIPO . | |

*Primary Examiner*—Duane S. Smith
*Attorney, Agent, or Firm*—James B. Robinson

[57] ABSTRACT

A filter medium having high stiffness is provided. The filter is a nonwoven web of conjugate fibers which has a Frazier permeability above 200 CFM, an NaCl efficiency above 75 percent, a Gurley Stiffness above 700 mg, and a SEP value of above 80. The conjugate fibers may be polyolefin, more particularly polypropylene and polyethylene in a side-by-side configuration. The medium may be made into a filter by conventional means such as pleating. Such filters are useful in HVAC systems and transportation cabin air filtration.

19 Claims, 1 Drawing Sheet

U.S. PATENT DOCUMENTS

| | | | |
|---|---|---|---|
| 4,774,124 | 9/1988 | Shimalla et al. | 428/171 |
| 4,795,668 | 1/1989 | Krueger et al. | 428/174 |
| 4,814,032 | 3/1989 | Taniguchi et al. | 156/167 |
| 4,818,587 | 4/1989 | Ejima et al. | 428/198 |
| 4,839,228 | 6/1989 | Jezic et al. | 428/401 |
| 4,842,739 | 6/1989 | Tang | 210/489 |
| 4,874,659 | 10/1989 | Ando et al. | 428/221 |
| 4,874,666 | 10/1989 | Kubo et al. | 428/398 |
| 4,883,707 | 11/1989 | Newkirk | 428/219 |
| 4,948,515 | 8/1990 | Okumura et al. | 210/748 |
| 4,950,529 | 8/1990 | Ikeda et al. | 428/224 |
| 4,961,974 | 10/1990 | Jones | 428/34.2 |
| 4,981,749 | 1/1991 | Kubo et al. | 428/219 |
| 5,082,720 | 1/1992 | Hayes | 428/224 |
| 5,106,552 | 4/1992 | Goi et al. | 264/103 |
| 5,108,820 | 4/1992 | Kaneko et al. | 428/198 |
| 5,108,827 | 4/1992 | Gessner | 428/296 |
| 5,130,196 | 7/1992 | Nishio et al. | 428/373 |
| 5,133,917 | 7/1992 | Jezic et al. | 264/210.8 |
| 5,167,765 | 12/1992 | Nielsen et al. | 162/146 |
| 5,169,706 | 12/1992 | Collier, IV et al. | 428/158 |
| 5,198,057 | 3/1993 | Newkirk et al. | 156/83 |
| 5,225,014 | 7/1993 | Ogata et al. | 156/73.2 |
| 5,254,399 | 10/1993 | Oku et al. | 428/296 |
| 5,270,107 | 12/1993 | Gessner | 428/296 |
| 5,273,565 | 12/1993 | Milligan et al. | 55/528 |
| 5,284,704 | 2/1994 | Kochesky et al. | 428/296 |
| 5,336,552 | 8/1994 | Strack et al. | 428/224 |
| 5,350,620 | 9/1994 | Sundet et al. | 428/172 |
| 5,376,218 | 12/1994 | Mito et al. | 156/474 |
| 5,382,400 | 1/1995 | Pike et al. | 264/168 |
| 5,389,175 | 2/1995 | Wenz | 156/204 |
| 5,397,632 | 3/1995 | Murphy, Jr. et al. | 55/521 |
| 5,401,446 | 3/1995 | Tsai et al. | 264/22 |
| 5,424,115 | 6/1995 | Stokes | 428/296 |
| 5,429,745 | 7/1995 | Ogata et al. | 210/497.01 |
| 5,486,166 | 1/1996 | Bishop et al. | 428/311.5 |
| 5,490,846 | 2/1996 | Ellis et al. | 428/311.5 |
| 5,496,507 | 3/1996 | Angadjivand et al. | 55/528 |
| 5,498,463 | 3/1996 | McDowall et al. | 428/311.5 |
| 5,540,979 | 7/1996 | Yahiaoui et al. | 428/311.5 |
| 5,554,435 | 9/1996 | Gupta | 428/296 | ns and laminates using such a web as a component.
HIGH STIFFNESS NONWOVEN FILTER MEDIUM

BACKGROUND OF THE INVENTION

This invention relates generally to a nonwoven fabric or web which is formed from spunbond fibers of a thermoplastic resin and laminates using such a web as a component. The fabric has a high stiffness and may be used as a filter.

Thermoplastic resins have been extruded to form fibers, fabrics and webs for a number of years. The most common thermoplastics for this application are polyolefins, particularly polypropylene. Other materials such as polyesters, polyetheresters, polyamides and polyurethanes are also used to form nonwoven spunbond fabrics.

Nonwoven fabrics or webs are useful for a wide variety of applications such as diapers, feminine hygiene products, towels, recreational or protective fabrics and as geotextiles and filter media. The nonwoven webs used in these applications may be simply spunbond fabrics but are often in the form of nonwoven fabric laminates like spunbond/spunbond (SS) laminates or spunbond/meltblown/spunbond (SMS) laminates.

As filter media, some of the desired characteristics of nonwoven fabrics are that they be permeable to the fluid being filtered yet have a high filtration efficiency. Permeability to the fluid being filtered is quite important as low permeability could result in a high pressure drop across the filter requiring a higher, and hence more costly, energy input into the filtered fluid and shortening filter life. Low permeability could also result in physical damage to the filter upon being clogged with filtered particles because of increased pressure drop across the filter.

High filtration efficiency is, of course, the main purpose for a filter and great efficiency and ability to maintain the efficiency at an acceptable level are key to filter performance.

In many applications, filtration materials are required which have structural integrity by themselves and can be converted into various shapes and which will then hold that shape. This convertibility is aided by stiffening the filter medium. Commonly, stiff filter media can be made into a pleated shape which gives far more surface area for filtration than a non-pleated shape in the same space.

It is an object of this invention to provide a spunbond polyolefin nonwoven fabric or web for use as a filter medium which has a high permeability and high filtration efficiency. It is a further object of this invention to provide a filter medium which is stiff and so can be successfully converted into a finished pleated filter. It is yet another object of this invention to provide a pleated filter made from the filter medium.

SUMMARY OF THE INVENTION

The objects of this invention are achieved by a filter medium which is a nonwoven web of conjugate fibers having a Frazier permeability above 200 CFM, an NaCl efficiency above 75 percent, a Gurley Stiffness above 700 mg, and a SEP value of above 80. The conjugate fibers are made from polymers, more particularly polyolefins, still more particularly polypropylene and polyethylene in a side-by-side configuration. The filter medium may be treated by a hot-air knife, through-air bonded and electret treated during the production process. The medium has sufficient stiffness to be converted into a filter by conventional means such as pleating. Such filters may be used in air filtration for home or commercial heating, ventilating and air conditioning (HVAC) systems and may also be used in filtration of breathing air in transportation applications like automobile cabin air filtration, airplane cabin air filtration, and train and boat air filtration. While this invention is directed mainly to air filtration, other gasses may be filtered as well.

DEFINITIONS

Figure 1:
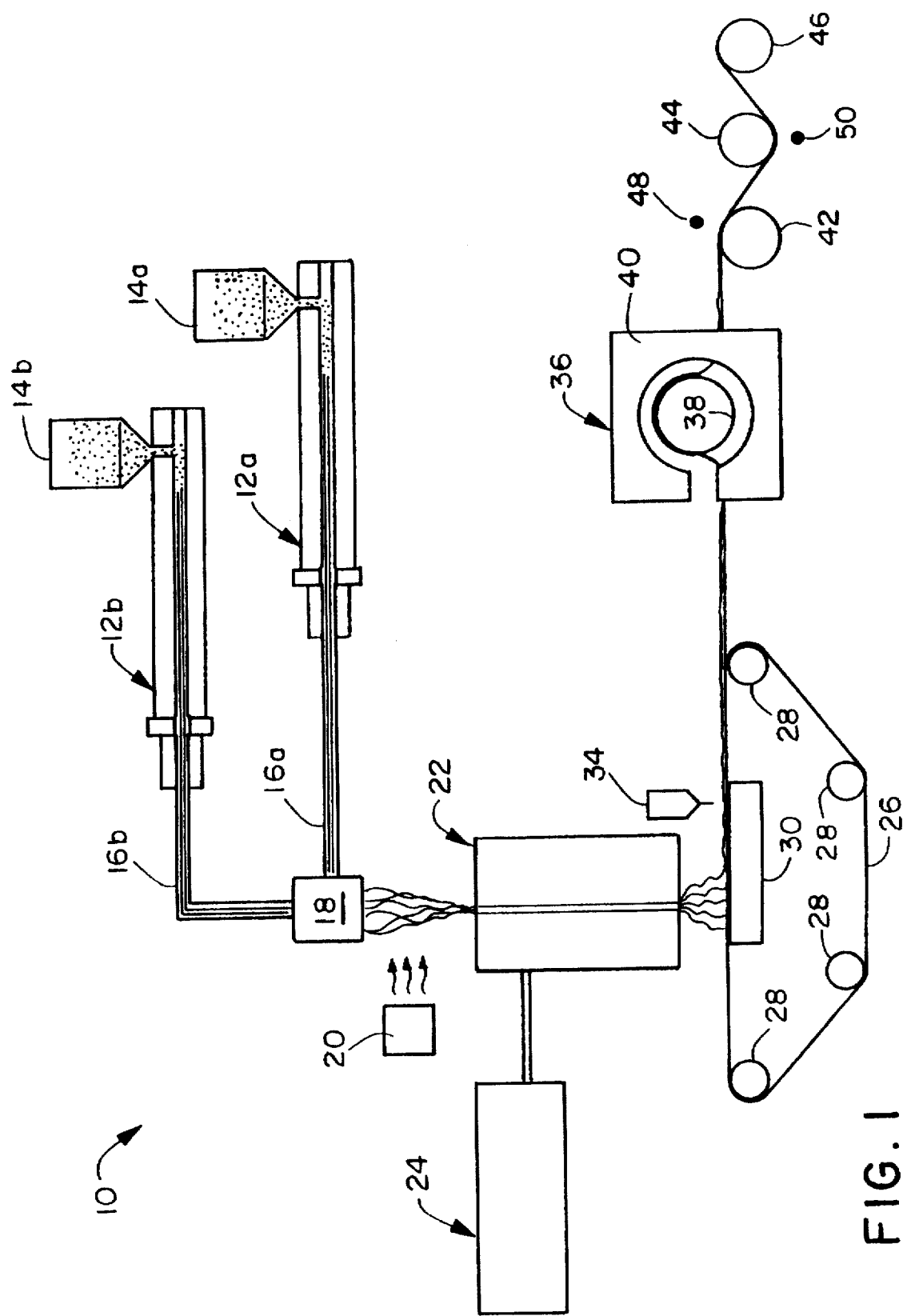
FIG. 1 is a schematic drawing of a process line for making a filter medium of this invention.

As used herein the term "nonwoven fabric or web" means a web having a structure of individual fibers or threads which are interlaid, but not in an identifiable manner as in a knitted fabric. Nonwoven fabrics or webs have been formed from many processes such as, for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 (152×0.89×0.00707=1.415). Outside the United States the unit of measurement is more commonly the "tex", which is defined as the grams per kilometer of fiber. Tex may be calculated as denier/9.

As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (using a sample size of at least 10) larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which may be continuous or discontinuous, am generally smaller than 10 microns in average diameter (using a sample size of at least 10), and are generally tacky when deposited onto a collecting surface.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include but are not limited to isotactic, syndiotactic and random symmetries.

As used herein, the term "machine direction" or MD means the length of a web in the direction in which it is produced. The term "cross machine direction" or CD means the width of web, i.e. a direction generally perpendicular to the MD.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, etc. These additives, e.g. titanium dioxide for color, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement, a segmented configuration or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein, the term "compaction roll" means a set of rollers above and below the web to compact the web as a way of treating a just produced spunbond web in order to give it sufficient integrity for further processing, but not the relatively strong bonding of secondary bonding processes like through-air bonding, thermal bonding and ultrasonic bonding. Compaction rolls slightly squeeze the web in order to increase its self-adherence and thereby its integrity. Compaction rolls perform this function well but have a number of drawbacks. One such drawback is that compaction rolls do indeed compact the web, causing a decrease in bulk or loft in the web which may be undesirable for the use desired. A second and more serious drawback to compaction rolls is that the web will sometimes wrap around one or both of the rollers, causing a shutdown of the web production line for cleaning of the rollers, with the accompanying obvious loss in production during the down time. A third drawback of compaction rolls is that if a slight imperfection is produced in formation of the web, such as a drop of polymer being formed into the web, the compaction roll can force the drop into the foraminous belt, onto which most webs are formed, causing an imperfection in the belt and ruining it.

As used herein, the term "hot air knife" or HAK means a process of pre- or primarily bonding a just produced spunbond web in order to give it sufficient integrity, i.e. increase the stiffness of the web, for further processing, but does not mean the relatively strong bonding of secondary bonding processes like TAB, thermal bonding and ultrasonic bonding. A hot air knife is a device which focuses a stream of heated air at a very high flow rate, generally from about 1000 to about 10000 feet per minute (fpm) (305 to 3050 meters per minute), or more particularly from about 3000 to 5000 feet per minute (915 to 1525 m/min.) directed at the nonwoven web immediately after its formation. The air temperature is usually in the range of the melting point of at least one of the polymers used in the web, generally between about 200° and 550° F. (93° and 290° C.) for the thermoplastic polymers commonly used in spunbonding. The control of air temperature, velocity, pressure, volume and other factors helps avoid damage to the web while increasing its integrity. The HAK's focused stream of air is arranged and directed by at least one slot of about ⅛ to 1 inches (3 to 25 mm) in width, particularly about ⅜ inch (9.4 mm), serving as the exit for the heated air towards the web, with the slot running in a substantially cross-machine direction over substantially the entire width of the web. In other embodiments, there may be a plurality of slots arranged next to each other or separated by a slight gap. The at least one slot is usually, though not essentially, continuous, and may be comprised of, for example, closely spaced holes. The HAK has a plenum to distribute and contain the heated air prior to its exiting the slot. The plenum pressure of the HAK is usually between about 1.0 and 12.0 inches of water (2 to 22 mmHg), and the HAK is positioned between about 0.25 and 10 inches and more preferably 0.75 to 3.0 inches (19 to 76 mm) above the forming wire. In a particular embodiment the HAK plenum's cross sectional area for cross-directional flow (i.e. the plenum cross sectional area in the machine direction) is at least twice the total slot exit area. Since the foraminous wire onto which spunbond polymer is formed generally moves at a high rate of speed, the time of exposure of any particular part of the web to the air discharged from the hot air knife is less than a tenth of a second and generally about a hundredth of a second in contrast with the through air bonding process which has a much larger dwell time. The HAK process has a great range of variability and controllability of many factors such as air temperature, velocity, pressure, volume, slot or hole arrangement and size, and the distance from the HAK plenum to the web.

As used herein, through air bonding or "TAB" means a process of bonding a nonwoven conjugate fiber web in which air which is sufficiently hot to melt one of the polymers of which the fibers of the web are made is forced through the web. The air velocity is between 100 and 500 fpm (30–152 m/min.) and the dwell time may be as long as 60 seconds. The air temperature may be between about 230° and 325° F. (110°–162° C.), depending on the melting points of the polymers used. The melting and resolidification of the polymer provides the bonding. Through air bonding is generally regarded a second step bonding process, and since TAB requires the melting of at least one component to accomplish bonding, it is restricted to webs with at least two components like conjugate fibers or those which include an adhesive.

As used herein, "ultrasonic bonding" means a process performed, for example, by passing the web between a sonic horn and anvil roll as illustrated in U.S. Pat. No. 4,374,888 to Bornslaeger.

As used herein "thermal point bonding" involves passing a fabric or web of fibers to be bonded between a heated calender roll and an anvil roll. The calender roll is usually, though not always, patterned in some way so that the entire fabric is not bonded across its entire surface and the anvil is usually flat. As a result, various patterns for calender rolls have been developed for functional as well as aesthetic reasons. One example of a pattern is the Hansen Pennings or "H&P" pattern with between about a 5 and 50% bond area with between about 50–3200 bonds/square inch as taught in U.S. Pat. No. 3,855,046 to Hansen and Pennings. One example of the H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). Another typical point bonding pattern is the expanded Hansen Pennings or "EHP" bond pattern which produces about a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. As in well known in the art, the spot bonding holds the laminate layers together as well as imparts integrity to each individual layer by bonding filaments and/or fibers within each layer.

As used herein, the term "bonding window" means the range of temperature of the mechanism, e.g. calender rolls or through-air bonding, used to bond the nonwoven web together, over which such bonding is successful. For polypropylene spunbond, this bonding window is typically from about 270° F. to about 310° F. (132° C. to 154° C.). Below about 270° F. the polypropylene is not hot enough to melt and bond and above about 310° F. the polypropylene will melt excessively and can stick to the calender rolls. Polyethylene has an even narrower bonding window at a lower temperature range, e.g. 235° to 260° F. (113°–127° C.).

Test Methods

Frazier Permeability: A measure of the permeability of a fabric or web to air is the Frazier Permeability which is performed according to Federal Test Standard No. 191A, Method 5450 dated Jul. 20, 1978, and is reported as an average of 3 sample readings. Frazier Permeability measures the air flow rate through a web in cubic feet of air per square foot of web per minute or CFM. Convert CFM to liters per square meter per minute (LSM) by multiplying CFM by 304.8.

NaCl Efficiency: The NaCl Efficiency is a measure of the ability of a fabric or web to stop the passage of small particles through it. A higher efficiency is generally more desirable and indicates a greater ability to remove particles. NaCl efficiency is measured in percent according to the TSI Inc., Model 8110 Automated Filter Tester Operation Manual of February 1993, P/N 1980053, revision D, at a flow rate of 32 liters per minute using 0.1 micron sized NaCl particles and is reported as an average of 3 sample readings. The manual is available from TSi Inc. at PO Box 64394, 500 Cardigan Rd, St. Paul, Minn. 55164.

Melt Flow Rate: The melt flow rate (MFR) is a measure of the viscosity of a polymer. The MFR is expressed as the weight of material which flows from a capillary of known dimensions under a specified load or shear rate for a measured period of time and is measured in grams/10 minutes at a set temperature and load according to, for example, ASTM test 1238-90b.

Gurley Stiffness: The Gurley Stiffness test measures the bending resistance of a material. It is carried out according to TAPPI Method T 543 om-94 and is measured in milligrams and reported as an average of 5 sample readings. The sample size used for the testing herein was 1.5 inch (3.8 cm) in the MD by 1 inch (2.54 cm) in the CD.

DETAILED DESCRIPTION

The spunbond process generally uses a hopper which supplies polymer to a heated extruder. The extruder supplies melted polymer to a spinneret where the polymer is fiberized as it passes through fine openings arranged in one or more rows in the spinneret, forming a curtain of filaments. The filaments are usually quenched with air at a low pressure, drawn, usually pneumatically and deposited on a moving foraminous mat, belt or "forming wire" to form the nonwoven web. Polymers useful in the spunbond process generally have a process melt temperature of between about 400° F. to about 610° F. (200° C. to 320° C.).

The fibers produced in the spunbond process are usually in the range of from about 10 to about 50 microns in average diameter, depending on process conditions and the desired end use for the webs to be produced from such fibers. For example, increasing the polymer molecular weight or decreasing the processing temperature results in larger diameter fibers. Changes in the quench fluid temperature and pneumatic draw pressure can also affect fiber diameter. The fibers used in the practice of this invention usually have average diameters in the range of from about 7 to about 35 microns, more particularly from about 15 to about 25 microns.

The fabric of this invention may be a multilayer laminate incorporating the high stiffness filter medium polymer fiber web and may be formed by a number of different techniques including but not limited to using adhesive, needle punching, ultrasonic bonding, thermal calendering and any other method known in the art. Such a multilayer laminate may be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5,169,706 to Collier, et al. or as a spunbond/spunbond laminate. An SMS laminate may be made by sequentially depositing onto a moving conveyor belt or forming wire first a spunbond web layer, then a meltblown web layer and last another spunbond layer and then bonding the laminate in a manner described above. Alternatively, the three web layers may be made individually, collected in rolls, and combined in a separate bonding step.

Areas in which the web of this invention may find utility are in filtration. More particularly, webs produced according to this invention are useful in heavier basis weight applications. Filter fabrics may have basis weights ranging from about 0.25 osy (8.5 gsm) to about 10 osy (340 gsm).

The fibers used to produce the web of this invention are conjugate fibers, such as side-by-side (S/S) fibers. The polymers used to produce the fibers are may be polyolefins, particularly polypropylene and polyethylene. As these conjugate fibers are produced and cooled, the differing coefficients of expansion of the polymers cause these fibers to bend and ultimately to crimp, somewhat akin to the action of the bimetallic strip in a conventional room thermostat. Crimped fibers have an advantage over uncrimped fibers in that they produce a more bulky web which therefore increases fabric or web permeability. High permeability is a very desirable characteristic for a filter and so crimped fiber filters are more desirable than uncrimped fiber filters.

Many polyolefins are available for fiber production, for example polyethylenes such as Dow Chemical's ASPUN® 6811A linear low density polyethylene, 2553 LLDPE and 25355 and 12350 high density polyethylene are such suitable polymers. The polyethylenes have melt flow rates in g/10 min. at 190° F. and a load of 2.16 kg, of about 26, 40, 25 and 12, respectively. Fiber forming polypropylenes include Exxon Chemical Company's ESCORENE® PD 3445 polypropylene and Himont Chemical Co.'s PF-304. Many other polyolefins are commercially available.

After the fibers are crimped and deposited on the forming wire and create the web of this invention, the web may be passed through a hot air knife or HAK to very slightly consolidate it and provide it with enough integrity for further processing. After deposition but before HAK treatment, the crimped fiber web has low stiffness which makes its difficult, if not impossible, to successfully pleat on commercially available pleating equipment commonly used to convert filter medium into finished filters. One aspect of this invention provides a means to utilize a nonwoven web having crimped fibers while also providing sufficient stiffness to convert the web into a finished filter by commercially available pleating equipment, by applying the HAK to the web. The application of the HAK allows forming a web of crimped fibers to deliver high permeability and stiffness by melting only a portion of the lower melting component in the web, preferably only that lower melting component on the side facing the HAK air, in a pre- or primary bonding step. This HAK step creates a zone of pre-bonded crimped fibers located on one side of the web which then undergo a second melting when exposed to through-air bonding. The exposure of this zone to at least two heating and melting cycles is believed to create a zone of high stiffness in the web from the crystallization of the polymer, however, since the zone is comprised of a small percentage of the total web, the effect on permeability of the web is minimized. This differs from the commonly used method of increasing the integrity of a web known as compaction rolls since while compaction rolls increase the stiffness of a web they also reduce the web permeability.

After treatment with the HAK, the web is sufficiently cohesive to move it to the next step of production; the secondary bonding step. The Secondary bonding procedure which may be used in the practice of this invention is through-air bonding because it does not appreciably reduce web pore size and therefore permeability. When used with HAK pre-bonding, through-air bonding very effectively produces high stiffness in the web since it provides a second heating of the polymer previously heated by the HAK and provides sufficient heat to bond fibers not bonded by the HAK. This creates bonds at almost every fiber crossover point, thereby restricting movement of the majority of the fibers of the web. Thermal point bonding by contrast results in bonds at discrete points, thereby allowing the fibers between the bond points the freedom to bend and rotate individually and so producing a much smaller increase in stiffness and so is not an acceptable bonding process for this invention.

Another method of increasing web stiffness is by simply increasing the basis weight of the web. This technique, however, is undesirable since it also increases the cost of the nonwoven web. It is also undesirable because the overall permeability of the web is again reduced. The HAK in conjunction with through-air bonding allows for increasing the stiffness of a web without the cost penalty associated with increasing the basis weight of the web and without adversely affecting the permeability of the nonwoven web.

After through-air bonding the web may be electret treated. Electret treatment further increases filtration efficiency by drawing particles to be filtered toward the filter by virtue of their electrical charge. Electret treatment can be carried out by a number of different techniques. One technique is described in U.S. Pat. No. 5,401,446 to Tsai et al. assigned to the University of Tennessee Research Corporation and incorporated herein by reference in its entirety. Tsai describes a process whereby a web or film is sequentially subjected to a series of electric fields such that adjacent electric fields have substantially opposite polarities with respect to each other. Thus, one side of the web or film is initially subjected to a positive charge while the other side of the web or film is initially subjected to a negative charge. Then, the first side of the web or film is subjected to a negative charge and the other side of the web or film is subjected to a positive charge. Such webs are produced with a relatively high charge density without an attendant surface static electrical charge. The process may be carded out by passing the web through a plurality of dispersed non-arcing electric fields which may be varied over a range depending on the charge desired in the web. The web may be charged at a range of about 1 kVDC/cm to 12 kVDC/cm or more particularly 4 kVDC/cm to 10 kVDC/cm and still more particularly 7 kVDC/cm to about 8 kVDC/cm.

Other methods of electret treatment are known in the art such as that described in U.S. Pat. Nos. 4,215,682 to Kubik et al, 4,375,718 to Wadsworth, 4,592,815 to Nakao and 4,874,659 to Ando.

Turning to FIG. 1, a process line 10 for preparing an embodiment of the present invention is disclosed. The process line 10 is arranged to produce conjugate continuous filaments, but it should be understood that the present invention comprehends nonwoven fabrics made with multicomponent filaments having more than two components. For example, the fabric of the present invention can be made with filaments having three or four components. The process line 10 includes a pair of extruders 12a and 12b for separately extruding a polymer component A and a polymer component B. Polymer component A is fed into the respective extruder 12a from a first hopper 14a and polymer component B is fed into the respective extruder 12b from a second hopper 14b. Polymer components A and B are fed from the extruders 12a and 12b through respective polymer conduits 16a and 16b to a spinneret 18. Spinnerets for extruding conjugate filaments are well-known to those of ordinary skill in the art and thus are not described herein detail. Generally described, the spinneret 18 includes a housing containing a spin pack which includes a plurality of plates stacked one on top of the other with a pattern of openings arranged to create flow paths for directing polymer components A and B separately through the spinneret. The spinneret 18 has openings arranged in one or more rows. The spinneret openings form a downwardly extending curtain of filaments which the polymers are extruded through the spinneret. For the purposed of the present invention, spinneret 18 may be arranged to form side-by-side or eccentric sheath/core conjugate filaments.

The process line 10 also includes a quench blower 20 positioned adjacent the curtain of filaments extending from the spinneret 18. Air from the quench air blower 20 quenches the filaments extending from the spinneret 18. The quench air can be directed from one side of the filament curtain as shown in FIG. 1, or both sides of the filament curtain.

A fiber drew unit or aspirator 22 is positioned below the spinneret 18 and receives the quenched filaments. Fiber draw units or aspirators for use in melt spinning polymers are well-known as discussed above. Suitable fiber draw units for use in the process of the present invention include a linear, fiber aspirator of the type shown in U.S. Pat. No. 3,802,817 and eductive guns of the type shown in U.S. Pat. Nos. 3,692,618 and 3,423,266, the disclosures of which are incorporated herein by reference.

Generally described, the fiber draw unit 22 includes an elongate vertical passage through which the filaments are drawn by aspirating air entering from the sides of the passage and flowing downwardly through the passage. A heater 24 supplies hot aspirating air to the fiber draw unit 22. The hot aspirating air draws the filaments and ambient air through the fiber draw unit.

An endless foraminous forming surface 26 is positioned below the fiber draw unit 22 and receives the continuous filaments from the outlet opening of the fiber draw unit. The forming surface 26 travels around guide rollers 28. A vacuum 30 positioned below the forming surface 26 where the filaments are deposited draws the filaments against the forming surface.

The process line 10 as shown also includes a hot-air knife 34 which receives the web as the web is drawn off of the forming surface 26. In addition, the process line includes a bonding apparatus which is a through-air bonder 36. After passing through the through-air bonder, the web is passed between a charging wire or bar 48 and a charged roller 42 and then between a second charging wire or bar 50 and roller 44.

Lastly, the process line 10 includes a winding roll 46 for taking up the finished fabric.

To operate the process line 10, the hoppers 14a and 14b are filled with the respective polymer components A and B. Polymer components A and B are melted and extruded by the respective extruders 12a and 12b through polymer conduits 16a and 16b and the spinneret 18. Although the temperatures of the molten polymers vary depending on the polymers used, when polypropylene and polyethylene are used as components A and B respectively, the preferred temperatures of the polymers range from about 370° to about 530° F. and preferably range from 400° to about 450° F.

As the extruded filaments extend below the spinneret 18, a stream of air from the quench blower 20 at least partially quenches the filaments to develop a latent helical crimp in the filaments at a temperature of about 45° to about 90° F. and a velocity from about 100 to about 400 feet per minute.

After quenching, the filaments are drawn into the vertical passage of the fiber draw unit 22 by a flow of hot air from the heater 24 through the fiber draw unit. The fiber draw unit is preferably positioned 30 to 60 inches below the bottom of the spinneret 18. The temperature of the air supplied from the heater 24 is sufficient that, after some cooling due to mixing with cooler ambient air aspirated with the filaments, the air heats the filaments to a temperature required to activate the latent crimp. The temperature required to activate the latent crimp of the filaments ranges from about 110° F. to a maximum temperature less that the melting point of the lower melting component which for through-air bonded materials is the second component B. The temperature of the air from the heater 24 and thus the temperature to which the filaments are heated can be varied to achieve different levels of crimp. Generally, a higher air temperature produces a higher number of crimps. The ability to control the degree of crimp of the filaments is a particularly advantageous feature of the present invention because it allows one to change the resulting density, pore size distribution and drape of the fabric by simply adjusting the temperature of the air in the fiber draw unit.

The crimped filaments are deposited through the outlet opening of the fiber draw unit 22 onto the traveling forming surface 26. The vacuum 20 draws the filaments against the forming surface 26 to form an unbonded, nonwoven web of continuous filaments. The web is then given a degree of integrity by the hot-air knife 34 and through-air bonded in the through-air bonder 36.

In the through-air bonder 36, air having a temperature above the melting temperature of component B and below the melting temperature of component B and below the melting temperature of component A is directed from the hood 40, through the web, and into the perforated roller 38. Alternatively, the through-air bonder may be a flat arrangement wherein the air is directed vertically downward onto the web. The operating conditions of the two configurations are similar, the primary difference being the geometry of the web during bonding. The hot air melts the lower melting polymer component B and thereby forms bonds between the conjugate filaments to integrate the web. When polypropylene and polyethylene are used as polymer components A and B respectively, the air flowing through the through-air bonder usually has a temperature ranging from about 230° F. to about 325° F. (110° C. to 162° C.), and a velocity from about 100 to about 500 feet per minute. It should be understood, however, that the parameters of the through-air bonder depend on factors such as the type of polymers used and thickness of the web.

The web is then passed through the charged field between the charging bar or wire 48 and the charging drum or roller 42 and then through a second charged field of opposite polarity created between charging bar or wire 50 and charging drum or roller 44. The web may be charged at a range of about 1 kVDC/cm to 12 kVDC/cm.

Lastly, the finished web is wound onto the winding roller 46 and is ready for further treatment or use.

The three key attributes for the desired filter medium of this invention are Frazier Permeability (P), NaCl efficiency (E), and Gurley Stiffness (S). Note that in calculating S, the stiffness is normalized for basis weight by dividing the Gurley Stiffness in milligrams by the basis weight in grams per square meter (mg/gsm). It is believed that filter medium produced according to this invention should have a Frazier Permeability of greater than about 200 CFM, an NaCl efficiency of greater than about 75 percent, and a Gurley Stiffness above about 700 mg. A convenient rule of thumb for combining these measurements is through the SEP value. The SEP value is defined by: [log(P×E)](S)(3.73) and gives an overall number for evaluation. It is believed that filter medium produced according to this invention should have an SEP value above about 80 and more particularly above about 90.

The filter medium of this invention may be made into a filter by any suitable means known in the art, though the preferred method is by rotary pleating. The rotary pleating process is quite dependent upon the stiffness of the filter medium. Gurley Stiffness values of at least 600 mg are required to allow pleating on high speed rotary pleating equipment while other methods of pleating are not as sensitive to web stiffness but are slower. Rotary pleating is desirable primarily from the perspective of the speed of the process, which is greater than other methods. A faster pleating process, of course, results in lower production costs and, ultimately, lower costs to the consumer. One such acceptable rotary pleating method is disclosed in U.S. Pat. No. 5,389,175 to Mann and Hummel, incorporated herein by reference in its entirety. This method involves scoring the filter medium and then putting it between at least two cogbelts spaced apart from one another and disposed above and below the filter medium web and running with the filter web, with the cogbelts subsequently pleating the filter medium according to the scoring. The pleated filter medium is then advanced with a defined distance between pleats by at least one helix adjoining the cogbelts.

Filters made according to this invention may be used in a number of different applications. The filters may be used in air filtration for home or commercial heating, ventilating and air conditioning (HVAC) services. They may also be used in filtration of breathing air in transportation applications like automobile cabin air filtration, airplane cabin air filtration, and train and boat air filtration. While this invention is directed mainly to air filtration, other fluids and other gasses may be filtered as well. Such other gasses may include, for example, nitrogen when produced or when used e.g., in industrial or medical settings. Other fluids may include liquids like oil or water.

The following sample data numbered 1-14 include Comparative Examples (1-10), an example of a web of the Invention (11) and Commercial product evaluations (12-14) and show the characteristics of webs which satisfy the requirements of this invention versus those that do not.

Samples 2-11 used a HAK. In these samples, the HAK air flowrate was about 3800 fpm (1160 m/min.), the HAK temperature was 360° F. (182° C.) and the HAK height above the web was 1 inch (2.54 cm) except for Example 2 where it was ⅞ inch (2.22 cm). Samples 2-10 were subjected to compaction rolls. Samples 2-11 used side-by-side conjugate fibers while sample 1 used sheath-core, and all samples 1-11 were extruded through spinnerets having a diameter of 0.6 mm to produce fibers having diameters of from 16 to 19 microns. Samples 1-11 used a polypropylene marketed by the Exxon Chemical Company of Houston, Tex. under the trade designation ESCORENE® PD 3445 and a linear low density polyethylene marked by the Dow Chemical Company of Midland, Mich. under the trade designation ASPUN® 6811A which were processed at a melt temperature of about 448° F. (231° C.). Samples 1-11 were processed through a through-air bonder at a temperature of between about 265° and 295° F. (130°-146° C.) at an air rate of between about 200 to 300 fpm (61-91 m/min.) for a time period of about 10 seconds. Samples 1-11 were treated according to the method of U.S. Pat. No. 5,401,446 by passing the web between a conductive bar or wire and a curved conductive drum with a non-arcing electric field between the bar or wire and the drum of about 8 kVDC/cm of separation between the bar and drum, and then passing the web through a second electric field generated by the same means and as the same strength as the first but with the field orientation being 180 degrees of the first relative to the web.

The comparative webs of samples 12-14 are from Reemay Inc., of Old Hickory, Tenn., are marketed under the trade designation REEMAY® and are webs commonly used in manufacturing filters. The particular webs used for samples 12-14 were, respectively, REEMAY® 6140, REEMAY® 6240 and REEMAY® 6260 fabrics.

After formation, the webs were tested for permeability, stiffness and efficiency according to the methods herein and the results are shown in Table 1.

TABLE 1

| Sample | Basis Weight (gm) | Gurley Stiffness (mg) | Frazier Permeability (P) (cfm/sq. ft.) | % Efficiency *(E) (0.1 um NaCl) | log(P × E) | (S) (mg/gm) | S.E.P. Value |
|---|---|---|---|---|---|---|---|
| 1 | 102 | 318 | 222 | 90.9 | 4.3 | 3.1 | 50 |
| 2 | 125 | 732 | 123 | 90.2 | 4.0 | 5.9 | 88 |
| 3 | 136 | 774 | 162 | 88.5 | 4.2 | 5.7 | 89 |
| 4 | 119 | 544 | 183 | 88.7 | 4.2 | 4.6 | 72 |
| 5 | 119 | 571 | 193 | 92.4 | 4.25 | 4.8 | 76 |
| 6 | 119 | 506 | 198 | 89.1 | 4.25 | 4.2 | 67 |
| 7 | 119 | 535 | 237 | 90.2 | 4.3 | 4.5 | 72 |
| 8 | 119 | 477 | 337 | 81.7 | 4.4 | 4.0 | 66 |
| 9 | 125 | 639 | 236 | 86.2 | 4.3 | 5.1 | 82 |
| 10 | 125 | 586 | 219 | 82.6 | 4.3 | 4.7 | 75 |
| 11 | 125 | 788 | 226 | 79.5 | 4.25 | 6.3 | 100 |
| 12 | 136 | 888 | 75 | 35.3 | 3.4 | 6.5 | 82 |
| 13 | 136 | 723 | 91 | 29.8 | 3.4 | 5.3 | 67 |
| 14 | 203 | 2741 | 85 | 32.1 | 3.4 | 10.4 | 132 |

The results show that the filter medium of this invention, sample 11, has a good combination of permeability, efficiency and stiffness. Sample 11 had a Frazier Permeability of greater than about 200 CFM, an NaCl efficiency of greater than about 75 percent, and a Gurley Stiffness above about 700 mg. Such attributes are very desirable in combination, resulting in a SEP value much greater than webs of comparable basis weights.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A filter medium comprising a nonwoven web of conjugate fibers having a Frazier permeability above 200 CFM, an NaCl efficiency above 75 percent, a Gurley Stiffness above 700 mg, and a SEP value of above 80.

2. The filter medium of claim 1 which has a basis weight between about 68 gsm and about 340 gsm.

3. The filter medium of claim 1 wherein said fibers are comprised of polypropylene and polyethylene in a side-by-side configuration.

4. The filter medium of claim 1 wherein said filter medium has a first side and a second side and further wherein conjugate fibers adjacent said first side are bonded together at fiber crossover points.

5. The filter medium of claim 4 wherein said first side of said web has an increased stiffness relative to the second side of said web.

6. The filter medium of claim 1 wherein said fibers have an electric charge.

7. The filter medium of claim 6 which is pleated.

8. A filter medium comprising a nonwoven web of crimped polypropylene/polyethylene side-by-side conjugate fibers having a basis weight between about 68 gsm and about 340 gsm and having a Frazier permeability above 200 CFM, an NaCl efficiency above 75 percent, a Gurley Stiffness above 700 mg, and a SEP value of above 80, formed by a process wherein said web is subjected to hot air knife treatment, through-air bonding and electret treatment wherein said electret treatment imparts a charge to said fibers.

9. The filter medium of claim 8 which is pleated.

10. A pleated filter comprising a nonwoven web of crimped polypropylene/polyethylene side-by-side conjugate fibers having a basis weight between about 68 gsm and about 340 gsm, a Frazier permeability above 200 CFM, an NaCl efficiency above 75 percent, a Gurley Stiffness above 700 mg, and a SEP value of above 80, formed by a process wherein said web is subjected to hot air knife treatment immediately after formation, through-air bonding after said hot air knife treatment, electret treatment to impart a charge to said fibers after said through-air bonding, and wherein said web is pleated to form a filter.

11. The filter medium of claim 1 wherein said nonwoven web is adapted to fit an HVAC air filtration system.

12. The filter medium of claim 1 wherein said nonwoven web is adapted to fit an transportation cabin air filtration system.

13. The filter medium of claim 1 wherein said nonwoven web is adapted to fit an automobile cabin air filtration system.

14. The filter medium of claim 9 wherein said nonwoven web is adapted to fit an HVAC air filtration system.

15. The filter medium of claim 9 wherein said nonwoven web is adapted to fit an transportation cabin air filtration system.

16. The filter medium of claim 9 wherein said nonwoven web is adapted to fit an automobile cabin air filtration system.

17. The filter medium of claim 10 wherein said nonwoven web is adapted to fit an HVAC air filtration system.

18. The filter medium of claim 10 wherein said nonwoven web is adapted to fit an transportation cabin air filtration system.

19. The filter medium of claim 10 wherein said nonwoven web is adapted to fit an automobile cabin air filtration system.

* * * * *

UNITED STATES PATENT AND TRADEMARK OFFICE
CERTIFICATION OF CORRECTION

PATENT NO. : 5,709,735

DATED : January 20, 1998

INVENTOR(S): Midkiff et al.

It is certified that error appears in the above-identified patent and that said Letters Patent is hereby corrected as shown below:

Column 2, line 41, "(152x0.89x0.00707=1.415)" should read --(15$^2$x0.89x0.00707=1.415)--;
Column 3, line 4, "am generally" should read --are generally--;
Column 5, line 34, "As in well known" should read --As is well known--;
Column 7, line 1, "the fibers are may be" should read --the fiber may be--;
Column 8, line 65, "the purposed of the present" should read --the purpose of the present--;
Column 9, line 8, "A fiber drew unit" should read --A fiber draw unit--;
Column 10, line 1, "less that" should read --less than--.

Signed and Sealed this

Twenty-first Day of July, 1998

Attest:

BRUCE LEHMAN

*Attesting Officer*   *Commissioner of Patents and Trademarks*